United States Patent
Hartog et al.

(10) Patent No.: US 7,586,617 B2
(45) Date of Patent: Sep. 8, 2009

(54) CONTROLLING A DYNAMIC SIGNAL RANGE IN AN OPTICAL TIME DOMAIN REFLECTOMETRY

(75) Inventors: Arthur Hartog, Winchester (GB); Kamal Kadar, Southampton (GB)

(73) Assignees: Schlumberger Technology Corporation, Sugar Land, TX (US); BP Exploration Operating Co. Ltd., Middlesex (GB)

( * ) Notice: Subject to any disclaimer, the term of this patent is extended or adjusted under 35 U.S.C. 154(b) by 94 days.

(21) Appl. No.: 11/766,866

(22) Filed: Jun. 22, 2007

(65) Prior Publication Data

US 2008/0316494 A1     Dec. 25, 2008

(51) Int. Cl.
  G01N 21/47    (2006.01)
  G01N 21/55    (2006.01)
(52) U.S. Cl. ...................... 356/447; 356/446
(58) Field of Classification Search .......... 250/227.11–227.18; 356/73.1, 445–448, 15–17; 385/141–147
See application file for complete search history.

(56) References Cited

U.S. PATENT DOCUMENTS

| | | | | |
|---|---|---|---|---|
| 3,354,773 A * | 11/1967 | Shreve | ........................ | 356/47 |
| 3,749,924 A * | 7/1973 | Vischulis | ................ | 250/227.11 |
| 4,283,725 A * | 8/1981 | Chisholm | .................... | 342/174 |
| 4,376,583 A * | 3/1983 | Alford et al. | ............. | 356/237.2 |
| 4,968,880 A * | 11/1990 | Beller | ................... | 250/227.21 |
| 5,241,315 A * | 8/1993 | Spinhirne | .................... | 342/54 |
| 5,248,871 A * | 9/1993 | Takenaka | ................ | 235/462.26 |
| 5,442,434 A * | 8/1995 | Liao et al. | ................... | 356/73.1 |
| 5,557,646 A * | 9/1996 | Honma | ........................ | 375/346 |
| 5,592,282 A | 1/1997 | Hartog | | |
| 5,636,014 A * | 6/1997 | Hanson | ....................... | 356/28 |
| 5,892,575 A * | 4/1999 | Marino | ...................... | 356/5.01 |
| 6,542,245 B2 * | 4/2003 | Toida | .......................... | 356/480 |
| 6,557,630 B2 | 5/2003 | Harkins | | |
| 6,751,556 B2 | 6/2004 | Schroeder | | |
| 6,758,271 B1 | 7/2004 | Smith | | |
| 6,811,087 B2 * | 11/2004 | Nakamura et al. | ..... | 235/462.26 |
| 6,913,083 B2 | 7/2005 | Smith | | |
| 7,000,696 B2 | 2/2006 | Harkins | | |
| 7,055,604 B2 | 6/2006 | Jee | | |
| 7,126,680 B2 | 10/2006 | Yamate | | |
| 7,215,416 B2 | 5/2007 | Yamate | | |

FOREIGN PATENT DOCUMENTS

| | | |
|---|---|---|
| GB | 2412432 | 9/2005 |
| GB | 2426331 | 11/2006 |
| JP | 63311127 | 12/1988 |
| JP | 1094236 | 4/1989 |
| JP | 5240733 | 9/1993 |

* cited by examiner

Primary Examiner—Gregory J Toatley, Jr.
Assistant Examiner—Jarreas C Underwood
(74) Attorney, Agent, or Firm—Daryl R. Wright; James L. Karka; Trop, Pruner & Hu, PC

(57) ABSTRACT

A technique includes providing an optical source signal to an optical fiber to produce a backscatter signal. A receiver is provided to detect the backscatter signal. During an acquisition period in which the backscatter signal is present, a sensitivity of the receiver is varied with respect to time to regulate an input signal range of an amplifier of the receiver.

22 Claims, 3 Drawing Sheets

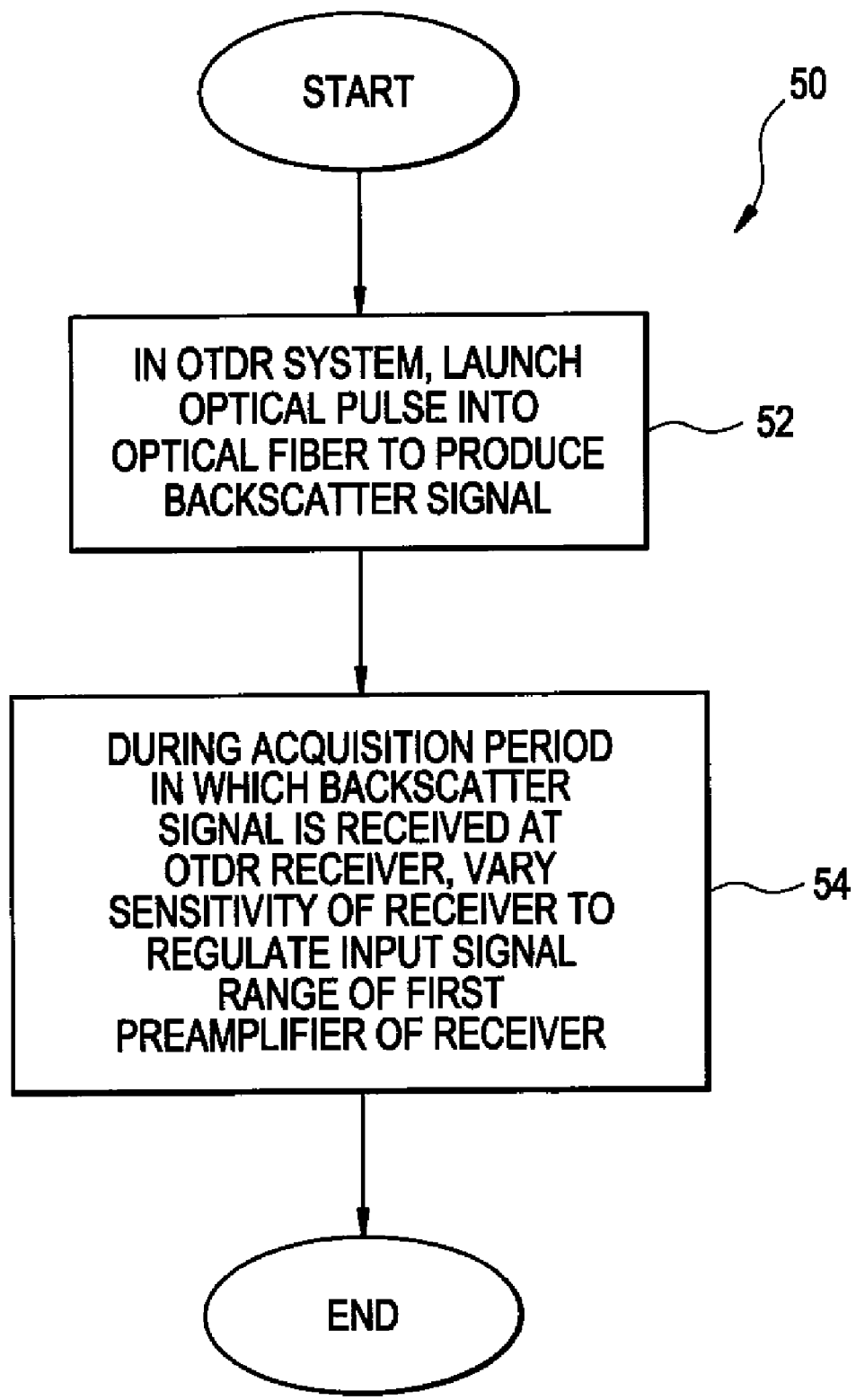

CONTROLLING A DYNAMIC SIGNAL RANGE IN AN OPTICAL TIME DOMAIN REFLECTOMETRY

BACKGROUND

The invention generally relates to controlling a dynamic signal range in an optical time domain reflectometry system.

It is often desirable to obtain a temperature versus depth profile of a region of interest. For applications involving a well, the temperature versus depth profile may be used for such purposes as monitoring hydraulic fracturing in the well (as an example). An optical fiber is one type of sensor which may be used to acquire the temperature versus depth distribution. More specifically, the optical fiber may be part of an optical time domain reflectometry (OTDR) system, a system that typically includes a reflectometer that launches an optical pulse into the optical fiber and tracks backscatter radiation as a function of the elapsed time since the launching of the pulse.

The intensity of the detected backscatter radiation conveys information about the attenuation of the medium through which the pulse is traveling and other properties, such as the local scattering coefficient. This information, in turn, may be used to generate a temperature versus depth (or length) distribution for the region of interest. OTDR techniques may also be used to determine the depth distribution of other quantities, including for example strain, disturbance, magnetic fields. The elapsed time may be converted to distance based on the knowledge of the group velocity of light in the medium; and thus, the elapsed time and the distance along the fiber may be referred to interchangeably.

For relatively long ranges, OTDR may encounter challenges due to the relatively wide dynamic range of the signals that are received by the reflectometer. The specific dynamic range for some reflectometers may reach 40 decibels (dB) one way and beyond (depending on fiber type, resolution and many other parameters), which translates to a variation of the optical power in the backscatter signal by eight orders of magnitude, or 160 dB in electrical dB terms. The long length of the optical fiber typically results in a strong attenuation in the propagation to and from the point of interest, and in the case of distributed sensors, the possible variation of the signal strength that results from the measurement itself adds to the dynamic signal range.

In a conventional OTDR system, an optical-to-electrical device, such as an avalanche photodiode (for example), converts the received optical energy into a current. A preamplifier converts the current from the photodiode into a voltage that then undergoes further processing by the rest of the system (further amplification, filtering and analog-to-digital conversion, as examples). At the lower end of the dynamic signal range, the noise of the preamplifier sets a minimum signal level that can be detected above the noise floor for a given degree of post-processing (signal averaging, for example). At the higher end of the dynamic range, the strongest allowable signal is the one that generates enough current to cause the preamplifier output to swing to, but not exceed, the preamplifier's maximum output voltage.

Although signal equalization downstream of the amplifier may help improve the linearity of the analog-to-digital conversion process, such equalization does not solve the fundamental problems that are set forth above. In addition, for the case in which the optical source is a narrow-band device, such as is the case in coherent optical time domain reflectometry, the dynamic signal range increases dramatically, such as by a factor of one hundred, for example.

Thus, there exists a continuing need for better ways to control a dynamic signal range in an OTDR system.

SUMMARY

In an embodiment of the invention, a technique includes providing an optical source signal to an optical fiber to produce a backscatter signal. A receiver is provided to detect the backscatter signal. During an acquisition period in which the backscatter signal is present, a sensitivity of the receiver is varied with respect to time to regulate an input signal range of an amplifier of the receiver.

In another embodiment of the invention, a system includes an optical source, a receiver and a circuit. The optical source provides an optical source signal to an optical fiber to produce a backscatter signal. The receiver is coupled to the optical fiber to detect the backscatter signal and contains a preamplifier. The circuit is adapted to, during an acquisition period in which the backscatter signal is present, vary a sensitivity of the receiver with respect to time to regulate an input signal range of a preamplifier of the receiver.

Advantages and other features of the invention will become apparent from the following drawing, description and claims.

BRIEF DESCRIPTION OF THE DRAWING

FIG. 2 is a flow diagram depicting a technique to control the dynamic signal range of a pre-amplifier of an optical time domain reflectometry receiver according to an embodiment of the invention.

DETAILED DESCRIPTION

Figure 1:
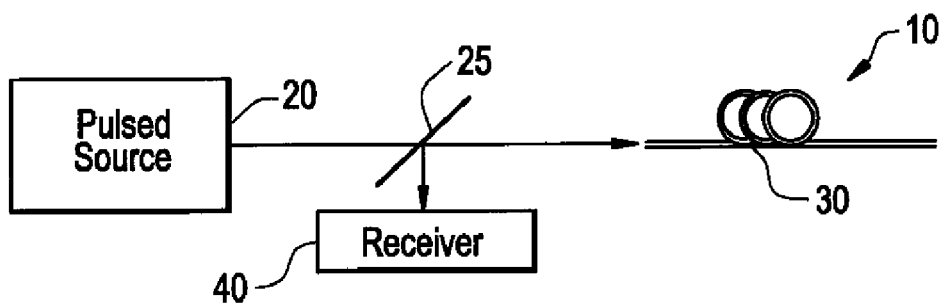
FIG. 1 is a schematic diagram of an optical time domain reflectometry system of the prior art.

Referring to FIG. 1, a conventional optical time domain reflectometry (OTDR) system 10 includes a pulsed optical source 20 and a directional coupling element 25, which couples the source 20 to an optical fiber 30. The optical fiber 30 traverses a region of interest (a region of a well, for example) so that a property (a temperature versus depth distribution, for example) of the region may be acquired, or measured. As examples, the directional coupling element 25 may be a beamsplitter, a directional coupler, a circulator or other suitable device depending on the particular embodiment of the invention. The optical source 20 generates an optical pulse that passes through the directional coupling element 25 to the optical fiber 30, and the optical pulse produces backscatter radiation in the form of an optical backscatter signal, which is directed by the directional coupling element 25 to an OTDR receiver 40 of the system 10.

The effective dynamic range of the optical backscatter signal typically is limited by the receiver 40 and in particular, by the first preamplifier of the receiver 40, which receives the current from the optical-to-electrical detector. In this regard, the noise floor of the receiver and the maximum signal that the receiver 40 may receive while remaining in its linear region dictate the dynamic signal range.

There are a number of tradeoffs that are involved in setting the dynamic signal range. For example, low noise, transimpedance preamplifiers ideally should have as high as feedback resistance as possible for purposes of reducing the thermal noise (Johnson noise, for example) that is introduced by the preamplifier. However, a large feedback resistance increases the overall gain of the preamplifier, thereby placing a lower limit on the dynamic signal than may be achieved with a larger feedback resistance due to maximum output voltage limit of the preamplifier. Thus, reducing the feedback resistance increases the maximum amplitude signal that may be received by the preamplifier, but such an approach raises the noise floor, thereby also increasing the minimum amplitude signal that can be detected.

In accordance with embodiments of the invention described herein, the sensitivity of the receiver is varied based on an estimate of the slowly-varying components of the backscatter waveform. As a result of this approach, from the standpoint of the first preamplifier of the OTDR receiver, the dynamic signal range of the backscatter signal is reduced as compared to conventional OTDR systems. The estimate may be based on typical characteristics of similar optical fibers or for measurements made from actual signals that are then low-pass filtered. The sensitivity of the receiver may be varied in a number of ways, as further described below.

Thus, referring to FIG. 2, in accordance with embodiments of the invention described herein, a technique 50 may be used in an optical time domain reflectometry system. The technique 50 includes launching (block 52) an optical pulse into an optical fiber to produce a backscatter signal. During an acquisition period in which the backscatter signal is received at an optical time domain reflectometry receiver, a sensitivity of the receiver is varied (block 54) to regulate the dynamic range of the signal that is received by the first preamplifier.

Figure 3:
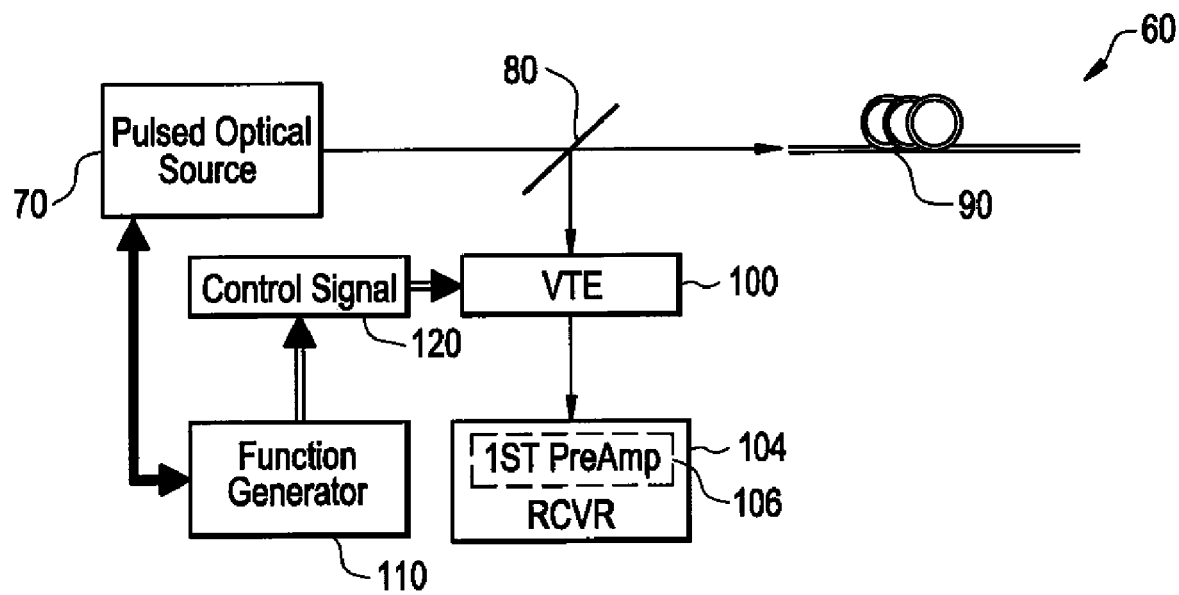
FIGS. 3, 4 and 5 are schematic diagrams of optical time domain reflectometry systems according to embodiments of the invention.

As a more specific example, FIG. 3 depicts an optical time domain reflectometry system 60 in accordance with some embodiments of the invention. The system 60 includes a pulsed optical source 70, which produces an optical pulse at the beginning of an acquisition period. A beam splitter 80 of the system 60 directs the optical pulse to an optical fiber 90. The optical pulse produces backscatter radiation in the optical fiber 90 in the form of an optical backscatter signal, which the beam splitter 80 directs in a path toward a receiver 104 that detects the optical backscatter signal and converts it into an electrical signal. However, before reaching a first preamplifier 106 of the receiver 104, the optical backscatter signal first passes through an optical element called a variable transmission element (VTE) 100 that regulates the signal's dynamic range The VTE 100 attenuates or amplifies the optical backscatter signal, depending on the particular embodiment of the invention. In embodiments of the invention described below, the VTE 100 is assumed to attenuate the optical backscatter signal (and thus, may be a variable optical attenuator (VOA), for example), although the VTE 100 may introduce a gain (and thus, may be a semiconductor optical amplifier, for example) in other embodiments of the invention. According to embodiments of the invention in which the VTE 100 is an attenuator, the VTE 100 attenuates the optical backscatter signal proportionately to the anticipated backscatter signal strength, thus ensuring that at least the low frequency content of the optical signal, which reaches the receiver 104 has a reduced signal range, as compared to the range of the optical backscatter signal that exits the optical fiber 90.

The true backscatter signal may be re-constituted based on 1.) the measured signal as provided by the receiver 104; and 2.) the transmission variation introduced by the VTE 100. The transmission of the VTE 100 is programmable, and the VTE 100 may have a frequency response that is sufficient to track at least the slowest components of the backscatter signal. In accordance with embodiments of the invention, the transmission of the VTE 100 is controlled by a function generator 110, which produces a control signal 120 that directly controls the transmitter function of the VTE 100.

The VTE 100 may be, for example, an electro-optic modulator, in which case the control signal 120 is a voltage that is applied to the VTE 100 to control its transmission. Alternatively, the VTE 100 may be replaced by an acousto-optic modulator (AOM) in which case the control signal 120 is a radio frequency (RF) waveform, the amplitude of which dictates the instantaneous transmission of the AOM. In other embodiments of the invention, the VTE 100 may be replaced by a magneto-optic modulator, the transmission of which is determined by a magnetic field that is applied across it and in turn is dictated by a current in a solenoid. The VTE 100 may also be replaced by a mechanical attenuator, based on, for example, micro-engineered mechanical systems (MEMs). In yet other embodiments of the invention, the VTE 100 may be replaced by an optical amplifier, the gain of which may be programmed.

The pulsed optical source 70 and the function generator 110 may be synchronized by a common trigger, or may be designed so that one triggers the other, depending on the particular embodiment of the invention.

Thus, as depicted in FIG. 3, the VTE 100 (or a replacement such as one of the alternatives noted above) attenuates the backscatter optical signal approximately proportionally to its strength for purposes of producing a signal that has a reduced dynamic range. In embodiments of the invention where the VTE amplifies the backscatter signal (i.e., the VTE introduces a gain), the VTE varies its gain approximately in inverse proportion to the backscatter optical signal.

Figure 4:
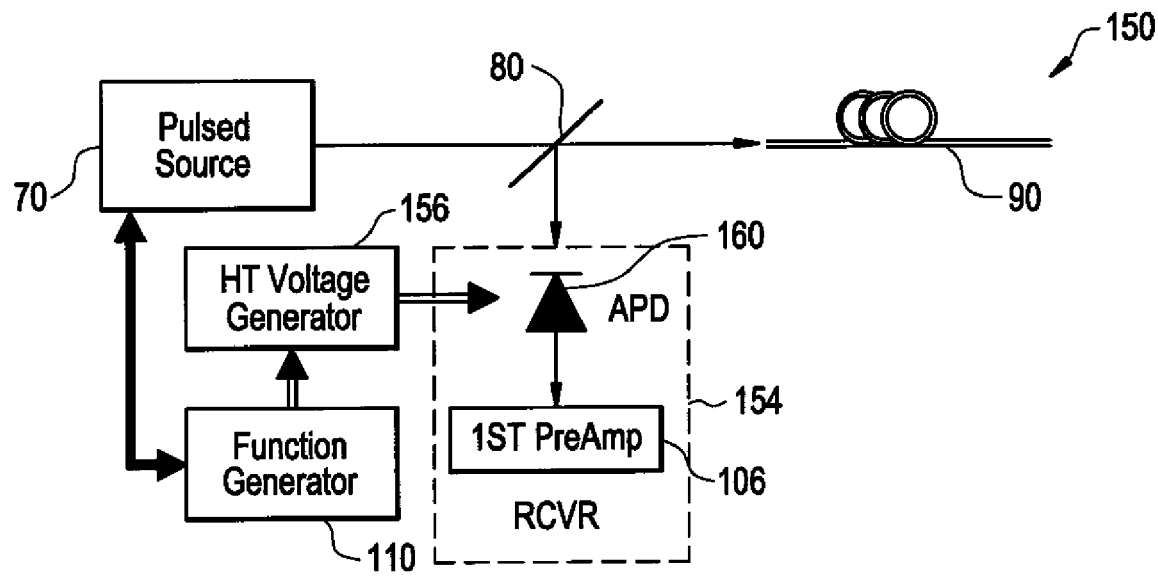

Alternatively, in accordance with other embodiments of the invention, the bias of a photodetector in the receiver, which has an internal gain, such as an avalanche photodiode (APD), may be varied. Thus, the gain of the APD may be varied throughout the acquisition period, in that the bias voltage of the APD may be generated by a programmable high voltage supply that is controlled by a function generator. Such an approach is illustrated for purposes of example by an optical time domain reflectometry system 150 of FIG. 4. Referring to FIG. 4 in conjunction with FIG. 3, it is noted that the system 150 (FIG. 4) has similarities to the system 60 (FIG. 3), where similar reference numerals are used to designate similar components. However, the system 150 differs in that a receiver 154 of the system 150 replaces the receiver 104 of the system 60. The receiver 154 includes an APD 160, which converts the received optical signal into an electrical signal that is received by the first preamplifier 106 of the receiver 154. The gain of the APD 160 is controlled by a high voltage power supply 156, which, in turn, is controlled by the function generator 10.

In other embodiments of the invention, the APD 160 may be replaced by another optical-to-electrical conversion device, such as a photomultiplier, for example.

Figure 5:
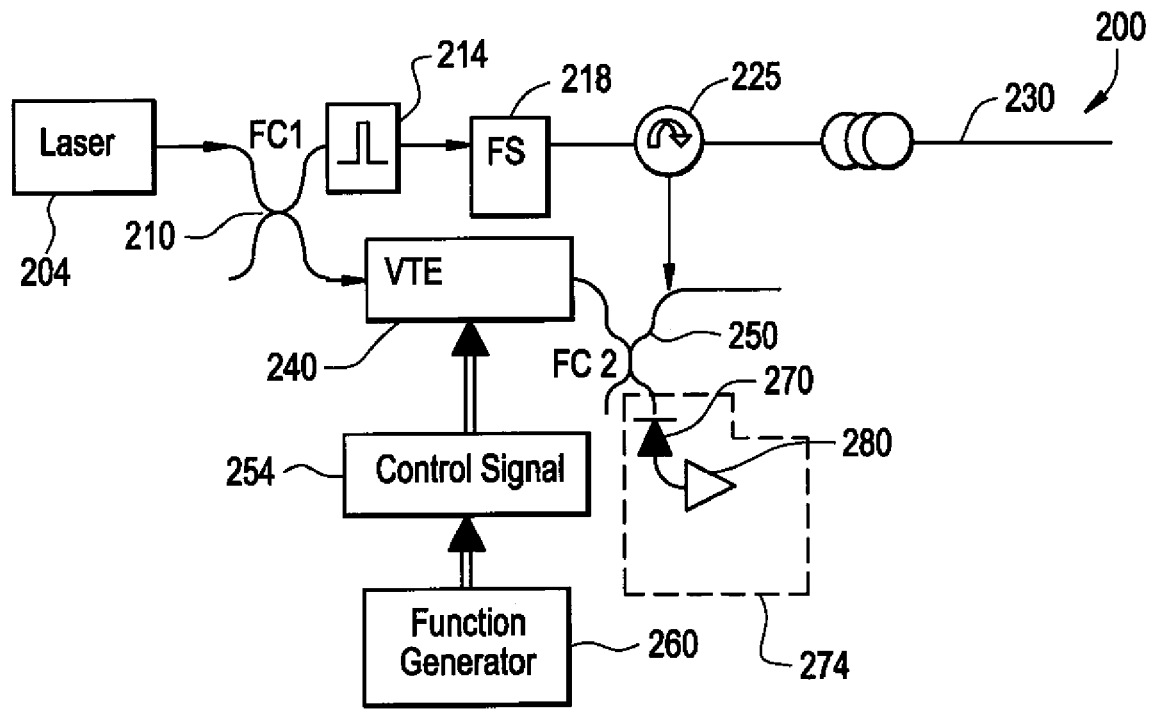

FIG. 5 depicts an optical time domain reflectometry system 200 in accordance with other embodiments of the invention. In the system 200, the optical energy is supply by a coherent optical source, such as a laser 204. The optical output from the laser 204 is converted by a pulse generator 214 into an optical pulse; and optionally a frequency shifter 218 translates frequencies in the optical pulse to produce an optical signal that is directed by an optical directional device 225 to the optical fiber 230. In response to the optical pulse, the optical fiber 230 produces an optical backscatter signal, which the optical directional device 225 directs to a fiber coupler 250.

The fiber coupler 250 mixes the backscatter signal with a local oscillator signal for purposes of varying the optical signal that is received by a receiver 274 to reduce its dynamic signal range. The purposes of a coherent detection system are also to improve the signal to noise ratio, since the photocurrent is proportional to the square root of the product of LO and a signal (backscatter in this case). Thus, by increasing the local oscillator power to a sufficient level, the photocurrent may be made stronger than the noise of the receiver, leaving the signal-to-noise ratio to be dominated by shot-noise. Coherent detection itself reduces the dynamic range of the signals due to the square root effect. However, the techniques described herein reduce the dynamic range yet further.

The output from the laser 204, which emits a constant output, is split off by a fiber coupler 210 to provide a local oscillator signal. The remainder is modulated into the pulse by the pulse generator 214 and (in the case of heterodyne detection) frequency shifted by the frequency shifter 218. A variable transmission element, such as a VTE 240, is placed in the local oscillator path and controls the amount of the local oscillator power that is available to combine with the backscatter signal at the fiber coupler 250. The VTE 240 is optically coupled to the laser 204 via a fiber coupler 210.

It is noted that the system 200 is merely an exemplary system that uses a coherent optical source, as other systems may be used, such as (for example), a system that varies the local oscillator power using a variable gain optical amplifier (a semiconductor optical amplifier, for example).

Ideally, the effective range of the receiver's sensitivity should be equal at least that of the slow components of the backscatter signal. However, even a lesser range reduces the demands on the dynamic range of the receiver.

In all cases, a decision is first made regarding the output of the function generator versus time (or distance along the fiber). If this output is constant, then the system is equivalent to a conventional OTDR system. The goal is to vary the receiver sensitivity so as to reduce the range of signals that are presented to the input of the first electrical preamplifier of the receiver.

In a first approach, the slow variations of the backscatter signal may be estimated based on typical values of the fiber attenuation coefficient. On this assumption, the signal from the receiver (called "$I_{rx}(z)$") may be described as follows:

$$I_{rx}(z) = E_0 \cdot \frac{v_g}{2} \cdot \alpha_s(z) \cdot B(z) \cdot \int_0^z \exp(-(\alpha(u) - \alpha_{attenuator}) \cdot du. \quad \text{Eq. 1}$$

In essence, the fiber loss is offset by a constant attenuation factor called "$\alpha_{attenuator}$" in Eq. 1. Also in Eq. 1, "$E_0$" represents energy of the probe pulse; "$v_g$" represents the group velocity; "$\alpha_s$" represents the scattering loss coefficient; "B" represents the scatter re-capture fraction; and "$\alpha$" represents the total attenuation coefficient. For a relatively good quality fiber, most of these coefficients are constant, and the backscatter signal primarily takes the form of an exponential decay. However, localized losses result in abrupt changes in the backscatter intensity, longitudinal variations of the scattering loss and the capture fraction also result in modulation of the generally exponential appearance of the backscatter waveform. In order to achieve such a transmission as a function of distance, the exponential variation of the transmission can be programmed into the function generator.

Alternatively, the function generator may initially be set to a constant transmission and a first backscatter signal may then be acquired. The first backscatter signal may then be used to program the function generator to a transmission that is, for example, inversely proportional to signal strength along the fiber. Based on this programming, the backscatter signal is proportional to the product of the instantaneous attenuation corresponding to each location in the fiber and the signal measured for that location. This approach offsets most of the dynamic range required of the receiver and the residual variation shows a finer level of detail and also, generally, higher frequency components. Thus, the system may be operated rather like a successive-approximation analog-digital converter in which a coarse measurement of the signal is subtracted first, allowing the converter to operate on a smaller range.

If desired, the process can be iterated further, with the output of the reconstructed backscatter waveform being used to tune the transmission/distance function. In some applications, the low-frequency components are of little interest, and therefore, the calibration of the variable sensitivity function is not particularly important.

In some cases, the response time of the VTE may be less than that of the variations on the backscatter signal, in which case the electrical signal that is received is a high-pass filtered version of the true backscatter signal. Where the low-frequency components are not of interest, then the electrical output can be used as is. If the complete backscatter function is required, then it can be obtained by multiplying the electrical output by the transmission of the VTE as a function of time.

The variable-sensitivity function may be calibrated by changing the control voltage function while measuring a fiber that is unchanged. For example, the first measurement of the backscatter function can be made a constant setting of the VTE transmission. Some time-modulation of the VTE may then be effected, and the resultant modulation of the backscatter function may be noted and used to relate the transmission versus control input.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   providing an optical source signal to an optical fiber to produce a backscatter signal;
   providing a receiver to detect the backscatter signal;
   estimating a characteristic of the backscatter signal prior to the backscatter signal being produced; and
   during an acquisition period in which the backscatter signal is present, varying a sensitivity of the receiver with respect to time to regulate an input signal range of an amplifier of the receiver based at least in part on the estimated characteristic of the backscatter signal, wherein the act of varying the sensitivity of the receiver comprises varying the sensitivity based at least in part on an estimation of relatively slowly varying components of the backscatter signal.

2. The method of claim 1, wherein the act of varying comprises varying the sensitivity of the receiver to reduce an input signal range of a preamplifier of the receiver.

3. The method of claim 2, wherein the preamplifier comprises the first preamplifier of the receiver to process the backscatter signal.

4. The method of claim 1, wherein the act of varying comprises:
   intercepting the backscatter signal with a variable transmission element; and controlling the variable transmission element to have a transmission that is approximately inversely proportional to a strength of the backscatter signal.

5. The method of claim 4, wherein the variable transmission element comprises one of the following:
an electro-optic modulator, an acouso-opto modulator, a magneto-optic modulator, a mechanical attenuator and an optical amplifier.

6. The method of claim 1, wherein
the act of providing the receiver comprises providing an optical-to-electrical conversion device, and
the act of varying comprises varying a gain of the optical-to-electrical conversion device to be approximately inversely proportional to a strength of the backscatter signal.

7. The method of claim 6, wherein the optical-to-electrical conversion device comprises an avalanche photodiode.

8. The method of claim 6, wherein the optical-to-electrical conversion device comprises a photomultiplier.

9. The method of claim 1, further comprising:
mixing the backscatter signal with a local oscillator signal to generate a mixed backscatter signal that is provided to the receiver,
wherein the act of varying comprises varying a power of the local oscillator signal approximately inversely proportional to a strength of the backscatter signal.

10. A system comprising:
an optical source to provide an optical source signal to an optical fiber line to produce a backscatter signal;
a receiver coupled to the optical fiber to detect the backscatter signal, the receiver comprising an amplifier; and
a circuit to, during an acquisition period in which the backscatter signal is present, vary a sensitivity of the receiver with respect to time to regulate an input signal range of the amplifier based at least in part on a predicted characteristic of the backscatter signal which was estimated prior to the backscatter signal being produced, wherein the circuit is adapted to vary the sensitivity of the receiver based at least in part on an estimation of relatively slowly varying components of the backscatter signal.

11. The system of claim 10, wherein the receiver comprises a pre-amplifier.

12. The system of claim 11, wherein the pre-amplifier comprises the first pre-amplifier of the receiver.

13. The system of claim 10, wherein the circuit comprises:
a variable transmission element to receive the backscatter signal and provide an output signal indicative of the backscatter signal; and
a function generator to control the variable transmission element to have a transmission that is approximately inversely proportional to a strength of the backscatter signal.

14. The system of claim 13, wherein the variable transmission element comprises one of the following:
an electro-optic modulator, an acousto-opto modulator, a magneto-optic modulator, a mechanical attenuator and an optical amplifier.

15. The system of claim 10, wherein
the receiver comprises an optical-to-electrical conversion device, and
the circuit comprises a function generator to vary a gain of the optical-to-electrical conversion device to be approximately inversely proportional to a strength of the backscatter signal.

16. The system of claim 15, wherein the optical-to-electrical conversion device comprises an avalanche photodiode.

17. The system of claim 15, wherein the optical-to-electrical conversion device comprises a photomultiplier.

18. The system of claim 10, further comprising:
an optical coupler to mix the backscatter signal with a local oscillator signal to generate a mixed backscatter signal; and
a function generator to vary a power of the local oscillator signal approximately inversely proportional to a strength of the backscatter signal.

19. The system of claim 10, wherein the optical source comprises a coherent source.

20. The method of claim 1, wherein the act estimating comprises:
estimating the characteristic of the backscatter signal based on a fiber attenuation coefficient.

21. The method of claim 1, wherein the act estimating comprises:
estimating the characteristic of the backscatter signal based on another previously received backscatter signal.

22. The system of claim 10, wherein the receiver comprises an optical time domain reflectometry receiver.

* * * * *